US007300058B2

(12) United States Patent
Ogilvie

(10) Patent No.: US 7,300,058 B2
(45) Date of Patent: Nov. 27, 2007

(54) REWARDING DETECTION OF NOTABLE NONRANDOM PATTERNS IN GAMES

(76) Inventor: John W. Ogilvie, 1320 E. Laird Ave., Salt Lake City, UT (US) 84105

(*) Notice: Subject to any disclaimer, the term of this patent is extended or adjusted under 35 U.S.C. 154(b) by 0 days.

(21) Appl. No.: 11/463,205

(22) Filed: Aug. 8, 2006

(65) Prior Publication Data

US 2007/0093284 A1 Apr. 26, 2007

Related U.S. Application Data

(63) Continuation of application No. 11/463,059, filed on Aug. 8, 2006.

(60) Provisional application No. 60/730,538, filed on Oct. 26, 2005.

(51) Int. Cl.
*A63F 13/00* (2006.01)
*A63F 1/00* (2006.01)

(52) U.S. Cl. .......................... 273/292; 273/139; 463/9; 463/16

(58) Field of Classification Search ................ 273/292, 273/139; 463/11, 13, 16, 20, 23, 25, 9; 283/901, 283/903
See application file for complete search history.

(56) References Cited

U.S. PATENT DOCUMENTS

| | | | | |
|---|---|---|---|---|
| 4,679,143 | A * | 7/1987 | Hagiwara | 463/25 |
| 5,667,439 | A * | 9/1997 | Okada | 463/20 |
| 6,394,901 | B1 | 5/2002 | Marta | |
| 6,468,155 | B1 * | 10/2002 | Zucker et al. | 463/23 |
| 6,645,071 | B2 | 11/2003 | Perrie et al. | |
| 6,902,166 | B2 | 6/2005 | Stern | |
| 6,918,834 | B2 * | 7/2005 | Vancura | 463/25 |
| 6,932,702 | B1 | 8/2005 | Harris | |
| 7,033,270 | B2 | 4/2006 | Baerlocher et al. | |
| 7,056,210 | B2 | 6/2006 | Bansemer et al. | |
| 7,066,813 | B1 | 6/2006 | Sakamoto et al. | |
| 7,074,127 | B2 | 7/2006 | Cuddy et al. | |
| 7,077,746 | B2 | 7/2006 | Torango | |
| 2003/0096643 | A1 | 5/2003 | Montgomery | |
| 2005/0037834 | A1 * | 2/2005 | Stern et al. | 463/20 |
| 2005/0148379 | A1 * | 7/2005 | Huard et al. | 463/16 |
| 2005/0151319 | A1 | 7/2005 | Berman et al. | |
| 2005/0181852 | A1 | 8/2005 | Groves | |
| 2005/0192086 | A1 | 9/2005 | Walker et al. | |
| 2005/0202864 | A1 | 9/2005 | Duhamel et al. | |

(Continued)

OTHER PUBLICATIONS

Mike Brunker, "Are poker 'bots' raking online pots?", www.msnbc.msn.com, Sep. 21, 2004.

(Continued)

*Primary Examiner*—Eugene Kim
*Assistant Examiner*—Alyssa M Hylinski
(74) *Attorney, Agent, or Firm*—Ogilvie Law Firm

(57) ABSTRACT

Tools and techniques are provided for creating nonrandom notable patterns in elements of games of chance which are traditionally random and hence lack such patterns. Players are notified of the existence of such patterns. When a player detects a pattern, the player may act on it to the player's advantage. Play may be monitored to determine whether a pattern has been detected by a player. Player rewards may be limited by a reward threshold, based on amounts wagered by the individual player and possibly other players. Play may be monitored to detect undesired play by software bots.

7 Claims, 3 Drawing Sheets

U.S. PATENT DOCUMENTS

| | | | | |
|---|---|---|---|---|
| 2005/0206076 | A1 * | 9/2005 | Ohira | 273/149 R |
| 2006/0036874 | A1 | 2/2006 | Cockerille | |
| 2006/0080175 | A1 | 4/2006 | Rowe et al. | |
| 2006/0154714 | A1 | 7/2006 | Montross | |

OTHER PUBLICATIONS

Nevada Revised Statutes, Chapter 465, leg.state.nv.us, no later than Oct. 25, 2005.

Utah Code Annotated, Section 76-10-1101, www.livepublish.le.state.ut.us, no later than Oct. 25, 2005.

Izak Matatya, "Flat Bet Mini Play Baccarat System", letstalkwinning.vegasforums.com, no later than Oct. 25, 2005.

Wolfgang Ambach, "The P300—a sentiment indicator in daytraders?", www.igpp.de/german/es/pdf/APM2004-Ambach2.pdf, Jun. 2004.

Nicholas Findler, et al., "Heuristic Programmers and Their Gambling Machines", Proceedings of the ACM National Conference, pp. 28-37; 1974 (found online).

Dave Scharf, "Cast the Pebbles From Your Hand: Getting Aces Cracked Six Times in a Row Doesn't Seem Very Random", www.pokerpages.com, no later than Oct. 25, 2005.

Pages from Amazon.com listing for "Best of Poker" software product, no later than Oct. 25, 2005.

Byron Liggett, "Doc Holliday Gambler and Gunfighter", www.pokerplayernewspaper.com, Jul. 24, 2006.

Google search result for "define: poker", www.google.com, Aug. 6, 2006.

* cited by examiner

REWARDING DETECTION OF NOTABLE NONRANDOM PATTERNS IN GAMES

RELATED APPLICATIONS

"This application is a continuation of application Ser. No. 11/463,059 filed Aug. 8, 2006, which incorporates all material in, and claims priority to, United States provisional patent application Ser. No. 60/730,538 filed Oct. 26, 2005."

BACKGROUND

Poker is a very well-known card game. More precisely, "poker" refers to any of a family of card games, many of which are played for entertainment and—on occasion—for profit. One feature shared by most, if not all, of the various games known as "poker" is that players bet in rounds. Another shared feature is that hands are ranked (royal flush is highest, followed by straight flush, then four of a kind, and so on). The hand ranking used in different versions of poker is similar, if not always identical.

Another feature of poker, and also of many other card games, is that cards are normally given to players from a deck which has been shuffled, generated in a random order, or otherwise placed in a random order. Thus, players have come to expect that any patterns in the order of cards drawn from the deck are merely accidental. Too much predictability in the order of shuffled cards—particularly if that order favors one player—may well be seen as proof of cheating. Cheating is taken seriously. In the American West in the 1800's, card cheats were routinely shot dead. Even as recently as the 1970's, a United States Supreme Court case discussed the fatal shooting of a card cheat:

> The story began in June 1970, when one William Douglas, a professional gambler from Las Vegas, Nev., arrived in Memphis, Tenn., calling himself Ray Blaylock and carrying a gun and a deck of cards. It ended on the evening of Jul. 6, 1970, when Douglas was shot and killed in a Memphis apartment.
>
> Testimony at the trial in the Tennessee state court showed that one Woppy Gaddy, who was promised a cut of Douglas' take, arranged a game of chance between Douglas and Robert Wood, a sometime Memphis gambler. Unwilling to trust the outcome of the contest entirely to luck or skill, Douglas marked the cards, and by game's end Robert Wood and his money had been separated. A second encounter between the two men yielded similar results, and Wood grew suspicious of Douglas' good fortune. In order to determine whether and how Douglas was cheating, Wood brought to the third game an acquaintance named Tommy Thomas, who had a reputation of being a "pretty good poker player." Unknown to Wood, however, Thomas' father and Douglas had been close friends; Thomas, predictably, threw in his lot with Douglas, purposefully lost some $1,000, and reported to Wood that the game was clean. Wood nonetheless left the third game convinced that he was being cheated and intent on recouping his now considerable losses. He explained the situation to his brother, Joe E. Wood, and the two men decided to relieve Douglas of his ill-gotten gains by staging a robbery of the upcoming fourth game.
>
> At this juncture respondents Randolph, Pickens, and Hamilton entered the picture. To carry out the staged robbery, Joe Wood enlisted respondent Hamilton, who was one of his employees, and the latter in turn associated respondents Randolph and Pickens. Douglas and Robert Wood sat down to the fourth and final contest on the evening of Jul. 6, 1970. Joe Wood and Thomas were present in the room as spectators. During the course of the game, Douglas armed himself with a .38-caliber pistol and an automatic shotgun; in response to this unexpected development Joe Wood pulled a derringer pistol on Douglas and Thomas, gave the gun to Robert Wood, and left to tell respondents to move in on the game. Before respondents arrived, however, Douglas reached for his pistol and was shot and killed by Robert Wood. *Parker v. Randolph,* 442 U.S. 62 (1979)

In addition to card games, many other familiar games involve the presentation of some randomly chosen value to players. This is true whether the games are informal, or whether they are played in an institution such as a legally regulated casino. Some of the many examples of random moves include cards drawn from a shuffled deck, roulette wheel destinations landed on by a ball, numbers placed on a keno sheet, and the landing position of thrown dice. In poker, roulette, keno, craps, and other games of chance, players have come to expect that certain elements are randomly chosen, and many players would often be surprised—and even angered—if those elements were not in fact random in a given game. Accordingly, random number generation is a key aspect of automated games of chance.

This does not eliminate player skill as a factor. But traditionally, player skill is a skill in "playing the odds", that is, in taking advantage of statistical likelihoods that are based on the assumption that the individual moves (card draws, roulette wheel outcomes, dice toss, etc.) are random. In short, the fact that a player is skilled at playing the odds simply reinforces the importance of randomness in games of chance.

Other aspects of technology and culture, discussed herein or previously known to those of skill in the art, may also be helpful in understanding the present invention.

SUMMARY

The present invention provides tools and techniques for including nonrandom notable patterns in games of chance where players traditionally expect only random moves. Some methods of the invention include notifying a player that a game presents from time to time a nonrandom notable pattern which the player may detect and take advantage of during play; creating at least one nonrandom notable pattern in the game linking moves by the player to other moves, the game having a traditional counterpart which is free of created nonrandom notable patterns; presenting the player with random moves and with a nonrandom notable pattern of moves in the game; determining whether the player has detected the nonrandom notable pattern; and rewarding the player if the player has detected the pattern.

The phrase "nonrandom notable pattern" was coined by the inventor for this application; it has a particular meaning provided by the examples and discussion herein. In particular, in some embodiments game play under the invention includes at least one move (made within or in response to a nonrandom notable pattern) which is disallowed under traditional random game play. To give just one example, a nonrandom notable pattern might include an ace in each of ten consecutive hands, resulting in more than four aces being drawn from one virtual deck in an automated game of poker or blackjack.

Nonrandom notable patterns may be created, for example, by reordering at least one subsequence of a random sequence of N game moves to form at least one nonrandom notable pattern; by adding game moves around a nonrandom notable pattern of game moves, wherein the added moves depart from the nonrandom notable pattern; and/or by changing at least one randomly generated game value to conform with a nonrandom notable pattern of game moves. A nonrandom notable pattern may be a numeric pattern, a geometric pattern, or a pattern in card suits, for example.

Rewarding the player if the player has detected the pattern may be done by giving the player bonus play, giving the player casino comps credit, giving the player cash or a cash equivalent, and/or publicly listing the player among other winners, for example. In some embodiments, part of the pattern is withheld from presentation if a determination is made that rewarding the player further would cause the player's reward to exceed a specified reward threshold. The reward threshold can be specified by a fixed amount which is independent of any given player's record of game play, or based on the player's total winnings over one or more play sessions, or on wagers by other players.

Although many of the examples given herein are methods, the invention provides generally corresponding devices, systems, configured computer-readable storage media, signals, and process products, as well as methods. The examples are merely illustrative. The present invention is defined by the claims, and to the extent this summary and/or incorporated material from a parent priority document conflicts with the claims, the claims should prevail.

DRAWINGS

To illustrate the manner in which the advantages and features of the invention are obtained, a description of the present invention is given with reference to the attached drawings. These drawings only illustrate selected aspects of the invention and thus do not fully determine the invention's scope.

DETAILED DESCRIPTION

Introduction

Figure 1:
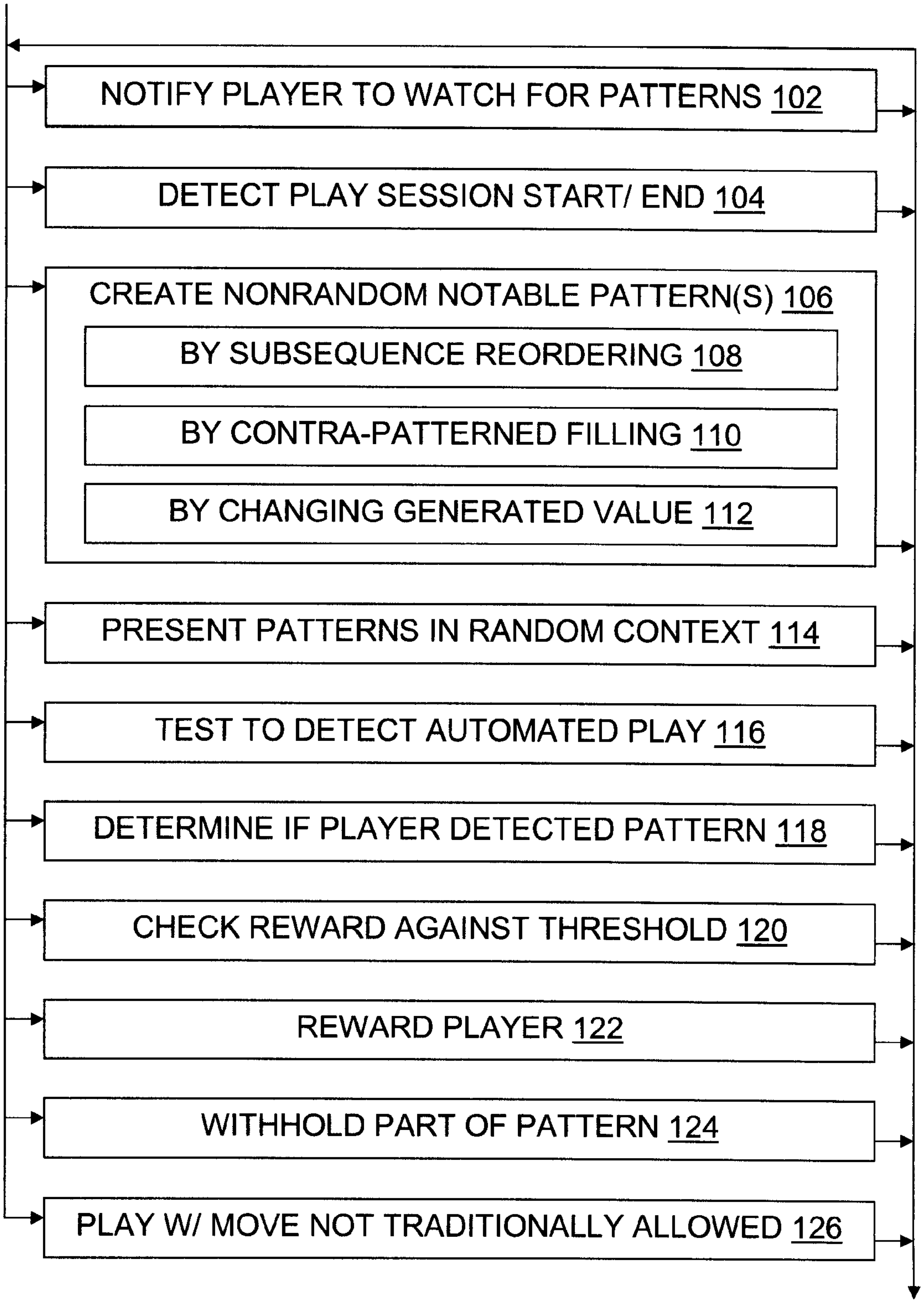
FIG. 1 is a flowchart illustrating methods of the present invention, from a house or game-playing-device point of view.

The present invention provides tools and techniques for including nonrandom notable patterns in games of chance where players traditionally expect only random moves. Players may detect these patterns and then act on them. In addition to the satisfaction of spotting a pattern, a player may be rewarded with extra play time, cash, or other tangible benefits. The patterns can be presented intermittently, in contexts which are fully random (free of such patterns) in traditional games.

In traditional games of chance, players have sometimes found apparent patterns, but these supposed patterns are mere coincidences. They are not intentionally created. They cannot be consistently relied on by a player. They are not patterns monitored by software within the game, such as software that monitors play to determine whether the player has detected the pattern, and/or software that monitors play to limit the reward given to the player for detecting and acting on the pattern. Patterns 314 of the present invention are different in one or more of these ways from apparent patterns.

The present invention provides tools and techniques that relate at least generally to games of skill and/or chance. Whether an embodiment of the invention lies within a particular definition of "gambling" depends at least on the definition and the specifics of the embodiment in question. However, at least some embodiments include variations on games which traditionally contain at least some element of chance and which have often been the object of wagers, such as poker, blackjack, roulette, craps, baccarat, and other games that are played in casinos and/or legally regulated.

In most if not all such traditional games, a very high value is placed by players on the actual randomness of a supposedly random element, and accordingly in casinos or other gambling venues a high value is placed on players' perception of the randomness of game elements that they expect to be random. Thus, examples of cheating include using loaded dice that do not produce outcomes distributed randomly, stacking a deck of cards in a known order or surreptitiously substituting hidden cards for cards that are supposedly drawn at random, using magnets or other forces to influence roulette balls to land in non-random locations, and so on.

Some games include outcomes determined solely in the physical world; some examples include sporting events such as horse races, boxing matches, football games, and so on. Table games such as poker, blackjack, roulette, craps, and so on originated as games played in the physical world with little or no automation. However, many games of chance and skill now also have versions that are implemented primarily or solely in computer form. Many slot machines, for instance, do not require one to physically pull an arm as in the original non-computerized version, but allow one to simply press a button, and the wheels may be physical or they may be implemented merely in software for display on a computer screen.

In this context, some embodiments of the present invention are formed as follows:

1. Select a game which has at least some traditional element of chance, and which can be implemented in a computerized form.
2. Introduce electronically at least one pattern into the chance element so it is not fully random (unlike the unmodified traditional game).
3. Reward the player if the player detects the pattern and acts on it.
4. Change the pattern at some point after the player detects it.

Some Specific Examples

The invention is illustrated in text and drawings by specific examples, but it will be appreciated that other embodiments of the invention may depart from these examples. For instance, specific features of an example may be omitted, renamed, grouped differently, repeated, instantiated in hardware and/or software differently, performed in a different order, or be a mix of features appearing in two or more of the examples. Reference is made to the figures throughout by reference numeral. Any apparent inconsistencies in the phrasing associated with a given reference numeral, in the figures or in the text, should be understood as simply broadening the scope of what is referenced by that numeral.

As an example, to create an embodiment of the present invention, one could select a device 202 for playing the game blackjack, modify the random card generation 208 in the software to create 106 a pattern 314 whereby a virtual dealer 230 always goes bust if the player's cards include a seven, feed 114 the player 228 examples of this pattern and monitor 118 play until the player stands 428 on three low hands (e.g., seven plus two, seven plus three, seven plus four) in a row instead of hitting as one would expect, and is rewarded 122 by seeing the dealer go bust, and then return to fully random 210 card generation. In some contexts, it may be legally necessary and/or profitable to notify 102 players in advance that such patterns 314 are sometimes introduced 114 into the game. In other contexts, it may be unnecessary and/or undesirable to disclose the use of such patterns, especially with patterns that are neutral (if undetected) or favorable (if detected and taken advantage of), from the player point of view when the player plays against the house and the inventive use of patterns does not give the house an unfair advantage.

As another example, one could select a device 202 for playing the game of poker, such as a video poker or other computerized device 202, modify the random card generation circuitry 208 to create 106 patterns 314 so that the player 228 receives 414 a flush when the player's original hand shows all four suits and the player draws three cards of three different suits (keeping the two cards of the fourth suit), continue this and monitor 120 until the player receives 414 five flushes in a row or receives 422 back 90% of the money 312 spent by the player in this session, whichever comes first. Then one switches to a pattern 314 in which the player's original hand always contains exactly two aces and the player draws a third ace if the player keeps the two aces and draws at least one card, and continue this and monitor 118 until the player during four consecutive hands acts on the pattern by keeping the two aces and drawing at least one card (including a third ace). Then return to completely random play 210.

Some traditional versions of bingo, keno, or similar games involve randomly generated numbers/grid positions, which are then tested or daubed 310 to see if they match a predetermined geometric pattern, e.g., lying in consecutive positions filling a line, a diamond, or some more complex geometric win pattern. Matching the win pattern provides a player (sometimes only the first such player) with a payout or other benefit. Sometimes a player is allowed to make a guess as to what they think the full win pattern is, after part of the win pattern is matched. However, in traditional games the numbers/grid positions which are tested against the geometric win pattern are randomly generated 210. In variations according to the present invention, the numbers/grid positions are not always generated in a fully random manner. Instead, patterns 314 are introduced 106, e.g., from one game of keno or bingo to the next, in a manner that benefits at least one player who detects and acts on the pattern.

For example, during a first bingo game, the random generation of geometric win patterns is modified 106 so that a player 228 is offered a choice of bingo cards in which one card contains a numeric pattern, the numbers 2, 5, 8, 11, 14 adjacent in a row, and the random generation of called numbers is modified 106 so that these numbers are among the first seven called. The cards not selected by the player are displayed on screen 224 and daubed, so the player has a chance to see the 2, 5, 8, 11, 14 card win even if it was not the card the player selected. In the next game, an offered card contains the numeric pattern 3, 6, 9, 12, 15 adjacent in a row, and the random generation of called numbers is modified so that these numbers are among the first seven called. As before, the player sees 114 this bingo card win even if the player did not select it. In the next game, an offered card contains 1, 4, 7, 10, 13 adjacent in a row, and the random generation of called numbers is modified so that these numbers are among the first seven called; the player sees this bingo card win even if the player did not select it. The cycle then repeats as a pattern 314 (2, 5, 8, 11, 14 card in next game, then 3, 6, 9, 12, 15 card, then 1, 4, 7, 10, 13 card, and so on) until some pattern 314 presentation 114 exit state is reached. A pattern presentation exit state may be reached, in this bingo example or in other innovative bingo games and/or other modified games played according to the present invention, in various ways, subject to one or more conditions, such as when 120 the player reward meets or exceeds a threshold, when the player fails to detect 418 the pattern, when the player quits 404 playing, or when the pattern 314 runs its full course during play.

Embodiments Generally

More generally, some methods of the invention include notifying 102 a player 228 that a game presents from time to time a nonrandom notable pattern which the player may detect 418 and take advantage of 428 during play. The game may have a traditional counterpart which is free of created nonrandom notable patterns; examples of such games include poker, craps, roulette, and other games of chance that have long been provided (in their traditional form) in casinos. Such a notice 226 may be given to the player by displaying it on a video screen 224, speaking it aloud in person or by recording, placing a printed notice sticker on the device 202, and/or in other ways. In some embodiments, a player can push a "start pattern" button, a "start numeric pattern" button, or the like, to either immediately begin presentation 114 of a pattern 314, or to merely increase the likelihood that a pattern 314 will soon begin presentation.

Some methods include creating 106 at least one nonrandom notable pattern 314 in the game. The pattern 314 may be a numeric pattern, a geometric pattern, or a pattern in card suits, for example. It may include two or more moves 310. The pattern may link moves 310 by the player to other moves by the house, by the player, and/or by one or more other players. Thus, in the blackjack example above, moves are linked such that the device 202 feeds 114 the player 228 examples of a pattern and monitors 118 play until the player stands 428 on three low hands in a row instead of hitting as one would expect. Similarly, in the poker example above, moves are linked such that the player 228 receives 414 a flush when the player's original hand shows all four suits and the player draws three cards of three different suits, with pattern presentation continuing until the player receives 414 five flushes in a row or receives 422 back a specified percentage of the money 312 spent by the player, whichever comes first. It will be understood that moves 310 can also be linked in other specific ways by embodiments of the invention.

Nonrandom notable patterns can be created in various ways. For example, in some embodiments, the creating step performs comprises subsequence reordering 108, namely, reordering at least one subsequence of a random sequence of N game moves to form at least one nonrandom notable pattern. Thus, after a traditional random number move generator 210 generated fifteen dice rolls, a pattern creation module 212 could sort 108 the third through thirteenth rolls into increasing numeric order, for instance, before the fifteen dice rolls were presented 114 to the player 228. Similarly, if a traditional random number move generator 210 generated twenty blackjack card pulls, then a pattern creation module 212 could sort 108 the third, fifth, seventh, ninth, eleventh, thirteenth, fifteenth, and seventeenth card into decreasing value order relative to each other, for instance, before those card pulls (and the other pulls) were presented 114 to the player.

In some embodiments, the creating step does 110 contra-patterned filling, namely, adding game moves around a nonrandom notable pattern of game moves, wherein the added moves depart from the nonrandom notable pattern. That is, a desired nonrandom notable pattern is generated, and randomly generated moves are placed before and/or after the pattern moves (or the placeholder for the pattern moves). This approach 110 provides more possible patterns 314 than subsequence reordering 108, as subsequence reordering must work with moves originally generated randomly, while contra-patterned filling need not be thus limited.

In some embodiments, the creating step changes 112 at least one randomly generated game value to conform with a nonrandom notable pattern of game moves. That is, variable values, data structure fields, or other memory 206 representations of game moves which have been generated are changed 112 to create a nonrandom notable pattern. Programmers will understand that this is equivalent to directly generating the nonrandom notable pattern, since the memory elements that receive the generated values of the nonrandom notable pattern hold some value (from prior execution, for instance, or uninitialized garbage after a reboot) which is overwritten with the desired values of the nonrandom notable pattern. This approach 112 provides the same theoretical space of possible nonrandom notable patterns as contra-patterned filling.

Moves constituting nonrandom notable patterns 314 are presented 114 to the player through a screen, speakers, or other user interface 224 components. Except for diagnostic 214 or other unusual purposes, normal play will include random moves and will intermittently present 114 one or more nonrandom notable patterns of moves in the game. This allows players 228 to discover patterns' existence within surrounding random noise, as well discovering the approximate or exact content of the patterns.

In some embodiments, the determining step 118 compares actual player moves with a template of expected moves by a hypothetical (or actual) model skilled player to determine whether the player has detected the nonrandom notable pattern. The working assumption is that the skillful player would detect the pattern 314 and move according to the template, and that a less skillful player would make different moves. Examples are given in discussing blackjack herein.

Nonrandom notable patterns may be chosen for generation with the goal of making it easier to determine when they've been detected, by choosing patterns 314 that call for a leap of faith by the player, that is, moves that go contrary to what would be done by a player who's playing the odds as if the game were fully traditional, or a by player who's responding more or less at random. Thus, a player who is playing traditional blackjack with cards drawn without replacement from a single deck would be expected to ask for an additional card if she drew cards totaling seven. But if the player has detected 418 a pattern in which the dealer 230 goes bust every time the player draws a diamond, then the player could manifest that detection 418 in a way determinable 118 by the device 202 by standing pat when she draws three of diamonds and four of hearts.

In some embodiments, the rewarding 122 step rewards the player if monitoring software 216 determines 118 that the player has detected the pattern. In some embodiments, with or without monitoring software 216, the player is rewarded 122 for detecting a pattern by virtue of receiving more advantageous outcomes. Regardless, rewards 312 may be in the form of giving the player bonus play, giving the player casino comps credit, giving the player cash or a cash equivalent, and/or publicly listing the player among other winners, for example.

In some embodiments, part of the pattern 314 is withheld 124 from presentation 114 if a determination is made 120 that rewarding 122 the player further would cause the player's reward to exceed a specified reward threshold. That is, a pattern may be terminated earlier than would otherwise occur, if continuing to present the pattern would give the player an advantage deemed too expensive and/or too risky to the house 230. The specified reward threshold may be specified by a fixed amount which is independent of any given player's record of game play. Alternately, it may be specified based at least in part on at least one of the following: the player's total winnings this play session, the player's total winnings over more than one play session, wagers by other players over a period of time.

Game play under some embodiments includes at least one move 310 which is disallowed under traditional random game play. For instance, card draws may go beyond those found in a traditional deck (or double deck, for games traditionally played with two decks). Similarly, roulette outcomes may simulate use of more than one ball. Dice outcomes may simulate use of more than the traditional number of dice, from which the traditional number is then chosen (by the house/device 202 or by the player).

Steps of a method may be repeated. For instance, additional nonrandom notable patterns may be presented 114. It may then be determined 118 whether they are detected by the player. Steps may also be done in a different order, omitted, combined, or otherwise depart from the outline presented above, provided that the method is operable and conforms with at least one claim.

Figure 2:
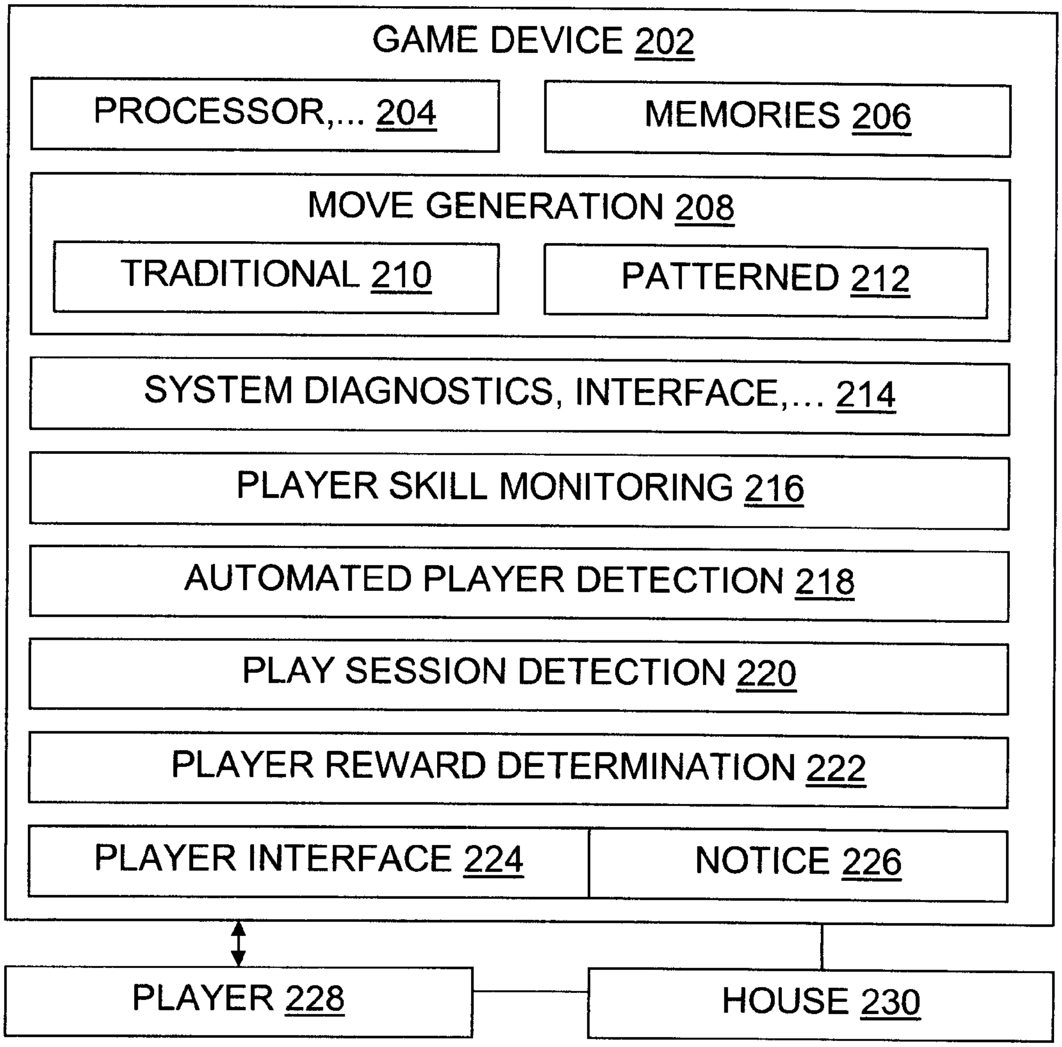
FIG. 2 is a block diagram illustrating a device of the present invention, in a usage context showing a player and a "house" such as a casino.
Figure 3:
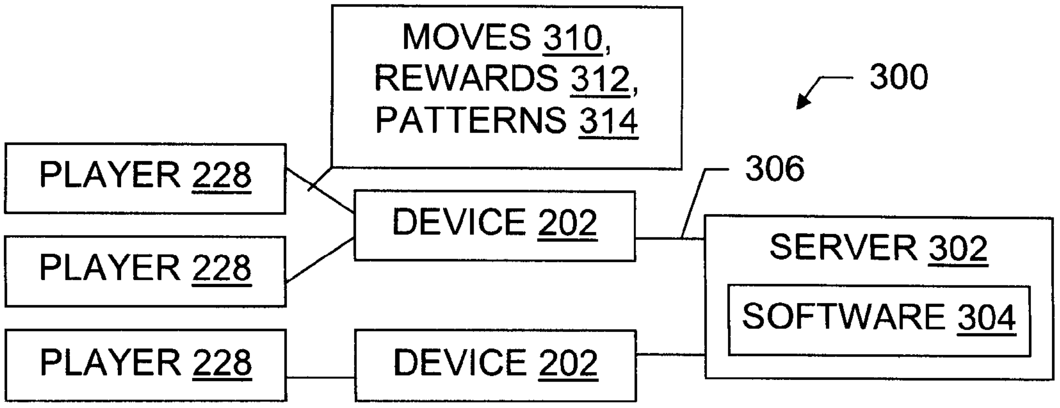
FIG. 3 is a block diagram further illustrating devices of the present invention in a usage context, including communication with a server computer.

The invention may also be embodied in devices 202 and in systems 300. Not every component shown in FIG. 2 need be present in every inventive device 202. A feature of a device 202 and/or system 300 may correspond to a method step performed by a player 228 and/or by a casino or other entertainment-providing house 230. Likewise, methods may be implemented by software and/or hardware in devices and/or in systems. For example, some device 202 embodiments are configured to withhold 124 part of the nonrandom notable pattern from presentation to the player if rewarding 122 the player further would cause the player's reward total for the session to exceed a specified reward threshold. Likewise, some devices allow multiple players 228 to play 310 the game together.

Some device 202 embodiments include a notice 226 to players that at least one game played with the device presents a nonrandom notable pattern. Such a notice need not use the phrase "nonrandom notable pattern" but need merely convey that the traditionally fully random element of a game is not fully random in this version of the game. The notice 226 may also convey that players can detect and take advantage of patterns in that game element. The notice phrasing may be chosen to reflect marketing, advertising, legal, and other concerns in addition to placing the player on notice of the intermittent presentation of patterns in the game. Many different phrasings are suitable. A few are given below, merely as examples:

"Watch for EXTRA ACES! If you see a fifth ace, don't worry—it means the dealer is following a pattern. Identify the pattern and bet accordingly!"

"NOTICE: In accordance with State Statute 12.34, this device intermittently introduces patterns into games that traditionally lack them. The Gaming Commission regulates these patterns and their deployment. Detecting and playing to these patterns can increase player winnings."

"LADY LUCK GETS REAL[SM] Play on this machine is not always fully random. Watch for patterns and win more!"

Some device 202 embodiments include a pattern creating means for creating at least one nonrandom notable pattern in the game by at least one of: subsequence reordering, contra-patterned filling, changing at least one randomly generated game value. Component 212 may be such a means; in other embodiments, component 212 creates patterns without doing so in the manner required of such a means. The pattern creating means may include software for performing at least one of: subsequence reordering 108, contra-patterned filling 110, changing 112 at least one randomly generated game value as discussed herein. Alternately, the pattern creating means may include such software in combination with a hardware memory 206, such as a EEPROM, RAM, ROM, hard disk, removable memory device, flash memory, CD-ROM, DVD, or the like, which is specially configured by the software. Alternately, the pattern creating means may include a special-purpose PAL, ASIC, FPGA, chip, or other special-purpose digital hardware component having the functionality of the software but not so easily replicated or modified as the software.

Some device 202 embodiments include a player interface 224 configured to permit the player to play the game and to present 114 the player with a nonrandom notable pattern during such play. Familiar general-purpose elements such as screens, keyboards, mice, touch screens, light pens, tablets, speakers, microphones, flashing lights, device drivers, operating systems, and the like, may be part of the interface 224. They may be controlled in part by the player, and in part by software which accepts player moves 310 and displays house moves 310. In some embodiments, the interface also rewards 122 the player with chips, vouchers, cash, extra play, public recognition, and/or other rewards 312.

Some device 202 embodiments include a player skill monitoring means 216 for determining 118 whether the player has detected 418 the nonrandom notable pattern 314. As with other "means" herein, this means 216 may be software, or software configuring general-purpose hardware, or special-purpose hardware, which provides the functionality of the corresponding method step(s).

Some device 202 embodiments include software code and/or hardware 218 for detecting 116 play by bots or other automated players. Some device 202 embodiments include software code and/or hardware 220 for detecting 104 the start and/or end of a play session.

The game(s) played with the device 202 and/or the inventive methods may be, for instance, a variety of poker, blackjack (a.k.a. twenty-one), baccarat, another game of playing cards, blackjack, a form of poker, baccarat, craps, roulette, Sic Bo, another casino table game, a lottery, a sweepstakes, and/or a dice game. In some embodiments, the game as played with the device 202 includes player decisions more complex than mere slot machine play. Unless otherwise expressly indicated, the present invention is not embodied in slot machines.

The device 202 may be located in a casino for game play by a person who is also in the casino. In this case, the device may be standalone in nature (not communicating electronically through a wired or wireless connection to another device and/or monitor/controller). However, a device 202 located in a casino may also communicate 306 to a server 302 or other monitor/controller, e.g., to track rewards given out and funds taken in by a group of machines collectively so that a house pool can be determined and used when calculating 120 a reward for a player at the device 202. Any technically suitable network, wireless network, serial, parallel, or other communication protocol can be used to link 306 the device with other devices and/or controllers. Controllers/monitors 302 are not directly accessible to players in general, but are instead restricted to use by casino administrators and technical support personnel.

Alternately, one or more devices 202 may be located outside a casino. Again, they may be standalone or networked 306. In particular, the device 202 may be connected over the Internet or another public switched or telecommunications network. This may be done such that the device communicates only player registration/authentication communication over the link 306, and/or communicates only play results over the link 306. Alternately, the device may be a client such as a web browser that receives substantive game functionality through a download and/or that otherwise accesses game software 212 which is located at least in part on a networked server 302 for game play online.

The invention may be embodied in CDs, DVDs, flash memories, hard drives, EEPROMS, ROMs, and/or other configured storage media 206 for use in a system or device. The general-purpose storage medium is configured with data and instructions to cause at least one device 202 having a processor 204 and a working memory (which may include more than the configured storage medium) to perform method steps. For example, one such configured medium includes code modules to notify 102 a player that a game presents a nonrandom notable pattern, to create 106 at least one nonrandom notable pattern in the game, to present 114 the player with a nonrandom notable pattern in the game, and to reward 122 the player for detecting the nonrandom notable pattern in the game.

Other method steps may be embodied. For instance, in one embodiment the steps include withholding 124 part of the nonrandom notable pattern from presentation to the player if rewarding the player further would cause the player's reward to exceed a specified reward threshold. In one embodiment, the steps include monitoring 104 to automatically detect at least one of: a play session beginning, a play session ending. In one embodiment, the steps include testing 116 to detect play by automated nonhuman players. As with methods and devices, in some configured storage medium embodiments playing the game includes at least one move which is disallowed under traditional random game play.

More About Nonrandom Patterns

Patterns 314 are introduced 106 into the traditionally random element of a game by software 212 and/or hardware 204, 206, 212 which is subject to a more complex set of goals, heuristics, and/or constraints than in move-generation components of traditional games. In traditional games, the move 310 generated (e.g., spin of slot wheels, draw of cards from virtual deck, rolled dice values, selected keno or bingo numbers) need simply be randomly selected from a specified set of possibilities (e.g., possible wheel positions, cards remaining in deck, value one through six for each of two dice, etc.). Moves 310 are game play actions which can alter the outcome of a game, from a player's perspective. They are substantive, not merely cosmetic, in nature. Introducing patterns 314 in moves 310 reduces randomness, without necessarily eliminating it in a given move, by imposing additional considerations. Thus, the present invention may be embodied using patterns detectable through player skill within random games of chance.

Among the prime considerations are:

1. How readily the pattern 314 can be detected by the player (pattern notability);
2. How the benefit 312 given to the player if the player recognizes the pattern will change the player's score (points, funds, comp credits, bonus play opportunities, etc.) for the given session;
3. How the benefit given to the player if the player recognizes 418 the pattern will change the house's score for the given session;
4. How the benefit given to the player if the player recognizes the pattern will change the house's score for the given game over one or more other periods.

For instance, using patterns that are easily notable—readily detectable by a (given) player—generally encourages play by those/that player(s), which in turn may benefit the house 230. Players may also derive great satisfaction from detecting 418 patterns and using 428 that skill to their advantage. Patterns that go undetected will have little or no benefit to either the player or the house relative to traditional games. Indeed, a traditional game could be viewed from a marketing and player satisfaction perspective, albeit not from a structural one, as being much like an game that nominally follows the teachings herein but provides only undetected patterns. There is little reason to create patterns 314 if they all go undetected.

Patterns 314 may take various forms. They may be numeric, or geometric, for example. A progression of bingo card patterns could be made notable, e.g., by repeating the winning pattern several times, or making the winning pattern a square that moves one position to the right each successive game In some cases, a pattern 314 is presented a certain number of times, which may be set according to the pattern's expected difficulty (low notability) in order to give more opportunities to detect subtler patterns. Then, if the pattern is not detected 118 by the player (as evidenced by the player acting 428 on it), the play moves either to a different pattern or to fully random move generation 210, and continues until another pattern is presented 114 or play ends 104, 404.

For games based on playing cards (cards from the set of ace, 2 through 10, jack, queen, king, possibly with jokers, in suits), the patterns 314 may be of many different types. By way of example, the same numeric card value may reappear in an order and with a frequency that is readily notable even if that is possible as well under unmodified fully random move generation. It is possible, for instance, that four consecutive hands 310 of blackjack would have a four as the first card, but that is so unusual that it is notable. The same card could also reappear, in a manner that is not possible 126 under traditional fully random play, as when cards are traditionally drawn from a deck without replacement but four consecutive hands draw 310 the same card (same number and same suit). Likewise, patterns 314 may involve more than one numeric card value, as when several consecutive hands draw a king and a queen, or when several consecutive hands draw two jacks. Patterns involving suits are also possible, as when several consecutive hands 310 draw 114 three clubs and two spades. Again, this could be a pattern which is rare but possible with fully random play, or it could be a pattern that is impossible 126 with fully random play, as when four consecutive hands of five cards each draw five hearts each hand from a single deck without replacement. Patterns involving numeric value and suit may also be presented in some embodiments in some circumstances. In dice games and roulette games, numeric patterns 314 can also be presented 114.

Player Rewards

In some cases, if the pattern has been recognized and acted upon by the player at least once, and if the benefit that would (or could) be accorded 122 to the player from again acting on the pattern exceeds some threshold, then the pattern is not presented again (presentation is terminated 124). Play instead moves according to another pattern or else proceeds according to random move generation until play ends or the next pattern is presented.

The reward threshold may be determined 222 in various ways. For instance, the threshold may be a set percentage of the amount wagered thus far by the current player in the current session of play, e.g., 15% regardless of the player's other wins this session, or 90% of the player's total winnings this session. The threshold may be a set percentage of the amount wagered thus far by the current player in all recorded sessions. With such thresholds, an individual player 228 will never come out ahead of the house 230 as a direct result of the beneficial patterns presented during play through modification of random move generation, although the player may still come out ahead as a result of fully random play if the game in question includes one or more intervals of fully random play mixed in with the patterned play. The threshold may also be 222 a set amount, rather than a percentage.

The reward threshold may also be 222 a set percentage of the wagers made by all players for the game in question, or for all devices playing that game, or for some larger or different set of devices that include the device 202 being played by the player in question, or for some other combination of house resources. Resources wagered by players other than the current player may be part of the calculation which determines 222 how much to let the current player benefit from recognizing and acting on patterns in the current game. Accordingly, with such thresholds an individual player may well come out ahead 422 of the house as a direct result of the beneficial patterns presented during play through modification of random move generation; the player is effectively garnering 422 income from wagers by other players, via the house 230. The threshold may also be a set amount, rather than a percentage.

Pattern Notability

Regardless of the type of game, a threshold value may be used to determine whether a pattern is deemed notable and hence suitable for automatic and/or electronic presentation 114. The pattern 314 notability threshold value may be determined empirically, based on a desired percentage recognition, e.g., to meet house revenue or player satisfaction targets. For instance, a pattern may be deemed notable if 75% of tested subjects 228 detect the pattern after at least two instances are presented to them, and if they do so in at least 50% of the trials. These numbers may, of course, be varied, e.g., a pattern may be deemed notable if it is found 118 that at least 80% of tested subjects detect it after at least three instances. Empirical results may also be used to rank patterns in levels according to their detection likelihood.

The notability threshold may also be determined statistically, e.g., a pattern 314 is deemed notable if it occurs less than some desired frequency in a fully random play 210. For instance, a pattern may be deemed notable if it occurs less than once per thousand times in a Monte Carlo simulation or other statistical analysis. This desired frequency may be varied, e.g., to once per ten thousand times, or once per five hundred, to give just two examples. Desired frequency levels may also be used to rank patterns 314 according to detection difficulty. Note that patterns which cannot occur 126 in traditional fully random play can be viewed as special cases of this approach, in which their desired frequency is zero per any arbitrarily large number of moves 310. Notability may also be a weighted blend of empirically determined difficulty level, statistically determined difficulty level, and perhaps some other factor, such as the cultural significance attached to certain cards which make them more prominent, e.g., Ace of Spades, Queen of Hearts, or certain card combinations, e.g., Four Aces. Likewise, in dice games, "snake eyes" may be deemed more notable than a pair of twos or a pair of threes, etc.

Notifying 102 a player to watch for patterns may make some or all patterns used more notable. That is, players may assume that a particular game is traditionally random unless told otherwise. A nonrandom notable pattern of moves, may be viewed as a cause-effect relationship, which provides predictability of game moves by the house in response to actions 310 by the player 228. Notability may be added or increased by giving the player a basis for predicting an outcome and/or giving the player influence over that outcome (other than the necessary decision of whether to continue playing). Detecting and acting on a nonrandom notable pattern according to the present invention can make play more advantageous to the player than traditional play. The play history generally can be helpful in detecting patterns in game play if such patterns exist.

Detecting nonrandom notable patterns requires some level of player skill. The level of skill required depends on factors such as the notability of the patterns and whether the player knows to watch for patterns.

Nonrandom notable patterns are notable in part because they are nonrandom items within a larger context of randomness. That is, the present invention may be embodied using patterns detectable through player skill within random games of chance. Creating 106 at least one nonrandom notable pattern in a game can be guided by a goal such as: making a notable pattern of conversions, or making a pattern of conversions which can be detected by a player. Patterns may have different notability, e.g., in one embodiment one could find readily notable nonrandom patterns, less easily notable nonrandom patterns, and random game moves.

In at least some embodiments, patterns that are displayed openly and fully without first requiring players to guess them are not notable. For instance, displaying a target shape and merely asking the player to locate it in a grid, as in the Battleship® game, is not creating 106 a nonrandom notable pattern. Openly displaying a pattern up front, before the player makes moves 310 to watch for and uncover the pattern, deprives the player of the chance to discover the pattern herself; such patterns are not notable, at best they are fully noted. Notable patterns are discoverable; they are not simply displayed without player effort to discover them. Part of the player's enjoyment comes from discovering 118 a pattern within randomness. Players may also enjoy hypothesizing different patterns and testing for their presence during play, through deduction, guesses, reference to past play, and other heuristics.

A pattern's notability relates to determination 118 of whether a player has detected the pattern. Empirical and/or statistical or other thresholds can be used to determine 118 automatically whether a player has detected 418 a presented pattern 314. For instance, it may be determined that the likelihood (statistical and/or empirical) that any player (or alternatively, based on recorded moves, that the current player) will stand instead of hit with twelve or less in blackjack is very low. Accordingly, if a pattern is presented that would reward the payer for standing at twelve or less, and the player does that, then the modified game device 202 or system 300 concludes 118 that the player detected the pattern.

In a similar spirit, if a pattern 314 is presented that is relatively easy to detect, but the player makes a move 310 inconsistent with accepting the pattern's reward, then it can be presumed 118 that the player did not detect the pattern. Accordingly, suppose an automated craps game 202 has a non-random play interval in which the uninterrupted pattern presented will be come-out rolls of 7, 2, 7, 3, 7, 4, 7, 5, 7, 6, 7, 7, 7, 8, 7, 9, 7, 10, 7, 11, 7, 12, and then fully random play resumes. If the player fails to begin betting for the naturals (7 or 11) by the time the fourth seven in the pattern sequence is rolled, then either the player has not detected 418 the pattern or else the player is not familiar with the game of craps. Unfamiliarity with the game could be eliminated automatically as an explanation, based on recorded demographic information about the player 228 and/or on the extended length of the current session and/or on a player request for display of a help screen 224 which highlights the possibility of winning when a 7 or 11 is rolled on the come-out roll.

Play Sessions

The beginning of a play session may be detected 104 automatically through activity after an inactive period of at least a specified duration, e.g., two minutes, or five minutes; by initiation of an online session, e.g., change in IP address, login, etc.; by entry of a player ID card, comps card, or the like; by I/O with the player, e.g., asking "New Player?"; or otherwise. The end of a play session can likewise be detected 104 automatically by the beginning of a subsequent new session, e.g., passage of inactive time, logout or internet session termination, removal of player ID card, I/O exiting the game, etc.

Automated Play

In some embodiments outside a physical casino setting or other venue in which players 228 can be seen by the house to be human, testing 116 can be done to detect play by pattern matching software, so-called "gambling bots", AIs, and the like. This may be viewed as a special instance of the general "Turing Test" problem, namely, the problem of distinguishing a tested human from a tested computer given only limited interaction with the subject being tested. Play by a computer (or equivalently, by a computer process) as opposed to play a human could be prevented and/or detected in various ways. CAPTCHAs (see www.captcha.net) and/or other testing techniques used, e.g., to prevent automated signup for email or domain name services, could also be used to prevent game sessions online with software that masquerades as a human player. Alternately or in addition, several increasingly harder-to-detect patterns could be presented 114, 116 in traditionally random intervals and it could then be assumed that software is playing if the patterns continue to be detected 418 and acted upon 428 in a manner beyond the ability of most humans (as empirically or otherwise determined). Similarly, if every pattern 314 introduced is very quickly detected and acted on, it could be assumed that software is playing.

Questions could also be periodically or randomly asked 116 of the player in English or another natural language, from a large collection, with answers that are obvious to humans but not to computers, e.g., "How many halves are there in a football game? (a) green (b) two (c) apple (d) science" or "What shape has as many sides as a dollar bill has corners? (a) square or rectangle (b) garbage (c) more trash (d) cheap bots do not read well". Indeed, such questions could be generated automatically, to prevent a bot author from simply encoding all the questions and their answers, in a manner perhaps like the text generation that is used by spam email generators. One method of automatic question generation 116 generates questions by randomly selecting colored icons from a predefined set of easily identified distinct colors to fill the blanks in the following template, and by randomly changing the position of the correct answer, and randomly changing the number of icons in a range from three to five: "What colors are these: ______ (a) red blue green (b) red green blue black (c) jam blue black green (d) orange tent house gray (e) blue blue black blue (f) whistle while you work (g) roses are red (h) red white blue green".

Player Methods

The present invention includes methods (and corresponding devices, systems, and configured media) for players which include components matching those illustrated in FIG. 1. For instance, some methods of the invention include receiving 402 notice that a game intermittently presents patterns 314 not found in moves of its traditional fully random counterpart, starting 404 a play session, receiving 414 a notable nonrandom pattern in a game element which is fully random in the traditional version of the game, detecting 418 the pattern, acting 428 on the basis of the pattern, receiving 422 a reward for detecting the pattern and acting accordingly, receiving 426 and/or making 426 a move 310 not possible in a traditional fully random game, and ending 404 play.

Additional Considerations

Although reference is made here to modifying random move, random card draw, or other random generation software 210 or circuitry 210, such modifications do not necessarily require actual change to a pre-existing traditional game. "Modification" and similar terms should be understand to refer as well to implementations 208 done from scratch which can be viewed as differing from otherwise generally corresponding traditional games which use only randomly chosen values in that the same or similar functional results 106 etc. achieved in the implementation from scratch could also be achieved by suitably modifying the traditional game. Modifications to a game are likewise understood to imply any necessary modifications to the software, hardware, user interface 224, notices, marketing, regulatory compliance, and other operational aspects of devices 202 or systems 300 which facilitate or operate according to the modified game's methods.

The invention may be embodied in various ways, e.g., processes 304 and/or hardware on a server computer 302, on a client or peer computer 202, or on a standalone computer 202, software (data instructions) in RAM 206 or permanent storage 206 for performing a process, general purpose computer hardware 204 configured by software, special-purpose computer hardware 204, data produced by a process, and so on. Computers, PDAs, cell phones, and any other device 202 having user interface 224 and in some embodiments (phone/computer) network transmission capabilities 214 may be part of a given embodiment.

Terms such as "computerized" refer to devices having a microprocessor 204 and memory 206, not merely to personal computers or servers. "Electronic" refers to digital and/or analog electronic circuitry. "Automatic" means without requiring ongoing real-time human input or guidance to perform the immediately contemplated operation. Touch screens, keyboards, other buttons, levers, microphones, speakers, light pens, sensors, scanners, and other I/O devices 224 may be configured to facilitate or perform operations to achieve or help achieve the methods and implement the gaming systems described here. Combinations of the aforementioned may also form a given embodiment.

Figure 4:
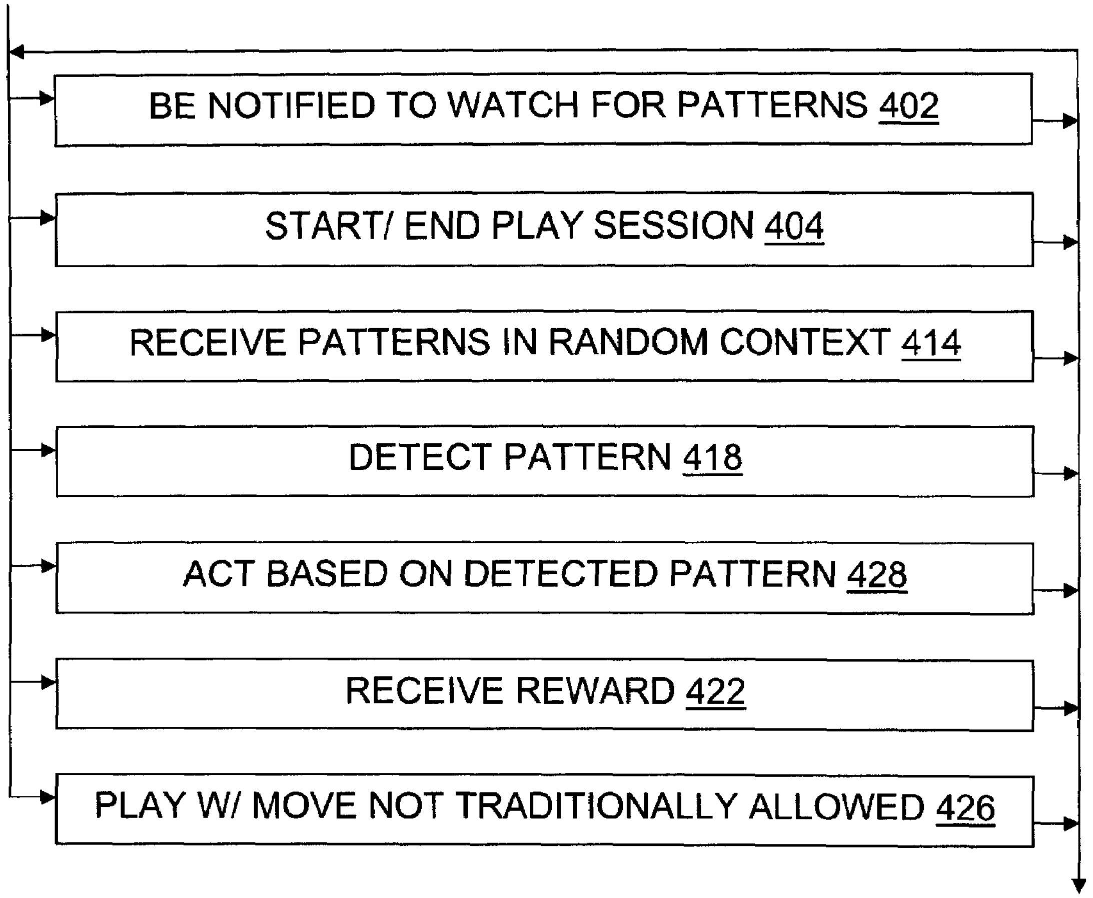
FIG. 4 is a flowchart illustrating methods of the present invention, from a player point of view.

Although particular embodiments of the present invention are expressly illustrated and described herein as methods, for instance, it will be appreciated that discussion of one type of embodiment also generally extends to other embodiment types. For instance, the descriptions of methods illustrated in FIGS. 1 and 4 also help describe systems 300 and devices 202, and help describe products (such as a sequence of screen displays) that are produced by methods. It does not follow that limitations from one embodiment are necessarily read into another.

All claims as filed are part of the specification and thus help describe the invention, and repeated claim language may be inserted outside the claims as needed. In the claims a reference to an item generally means at least one such item is present and a reference to a step means at least one instance of the step is performed. Headings are for convenience; information on a given topic may be found outside the section whose heading indicates that topic.

Definitions of terms are provided explicitly and implicitly throughout this document. Terms do not necessarily have the same meaning here that they have in general usage, in the usage of a particular industry, or in a particular dictionary or set of dictionaries. Reference numerals may be used with various phrasings, to help show the breadth of a term. The inventor asserts and exercises his right to his own lexicography.

Embodiments such as the methods illustrated or corresponding systems may omit items/steps, repeat items/steps, group them differently, supplement them with familiar items/steps, or otherwise comprise variations on the given examples. Suitable software to assist in implementing the invention is readily provided by those of skill in the pertinent art(s) using the teachings presented here and programming languages and tools such as C++, C, Java, scripting languages, HTML, XML, APIs, SDKs, network protocol stacks, assembly language, firmware, microcode, compilers, debuggers, packet sniffers, and/or other languages and tools.

Although this document includes one or more website addresses, the addresses and the material on the sites addressed by the stated addresses are provided only for background and/or as examples to help illustrate the invention. The document does not incorporate by reference any essential material from those websites or other sources.

The embodiments discussed are illustrative of the application for the principles of the present invention. Numerous modifications and alternative embodiments can be devised without departing from the spirit and scope of the present invention.

I claim:

1. A method of game play between a player and a house, comprising:

the house presenting to the player in a game a nonrandom notable pattern of house moves in the game, the game having a traditional counterpart which is free of created nonrandom notable patterns, the presented nonrandom notable pattern tending to increase player ability to predict house moves;

the house determining whether the player has detected the nonrandom notable pattern; and the house rewarding the player if the player has detected the pattern.

2. The method of claim 1, further comprising creating the nonrandom notable pattern at least in part by subsequence reordering, namely, reordering at least one subsequence of a random sequence of N game moves to form at least one nonrandom notable pattern.

3. The method of claim 1, further comprising creating the nonrandom notable pattern at least in part by contra-patterned filling, namely, adding game moves around a nonrandom notable pattern of game moves, wherein the added moves depart from the nonrandom notable pattern.

4. The method of claim 1, further comprising creating the nonrandom notable pattern at least in part by changing at least one randomly generated game value to conform with a nonrandom notable pattern of game moves.

5. The method of claim 1, wherein rewarding the player if the player has detected the pattern comprises at least one of: giving the player bonus play, giving the player casino comps credit, giving the player cash or a cash equivalent, publicly listing the player among other winners.

6. The method of claim 1, wherein part of the pattern is withheld from presentation, if a determination is made that rewarding the player further would cause the player's reward to exceed a specified reward threshold.

7. The method of claim 1, wherein the nonrandom notable pattern presented includes at least one move which is disallowed under traditional random game play.

* * * * *